(12) United States Patent
Hayashi et al.

(10) Patent No.: US 11,905,145 B2
(45) Date of Patent: Feb. 20, 2024

(54) REMOTE CONTROL TERMINAL AND WORK VEHICLE

(71) Applicant: TADANO LTD., Kagawa (JP)

(72) Inventors: Hiroyuki Hayashi, Kagawa (JP); Shinsuke Kanda, Kagawa (JP)

(73) Assignee: TADANO LTD., Kagawa (JP)

( * ) Notice: Subject to any disclaimer, the term of this patent is extended or adjusted under 35 U.S.C. 154(b) by 769 days.

(21) Appl. No.: 16/977,637

(22) PCT Filed: Mar. 8, 2019

(86) PCT No.: PCT/JP2019/009296
§ 371 (c)(1),
(2) Date: Sep. 2, 2020

(87) PCT Pub. No.: WO2019/172417
PCT Pub. Date: Sep. 12, 2019

(65) Prior Publication Data
US 2021/0047154 A1 Feb. 18, 2021

(30) Foreign Application Priority Data

Mar. 9, 2018 (JP) ................................. 2018-043258

(51) Int. Cl.
*B66C 13/40* (2006.01)
*B66C 13/16* (2006.01)
*G05D 1/00* (2006.01)

(52) U.S. Cl.
CPC ............. *B66C 13/40* (2013.01); *B66C 13/16* (2013.01); *G05D 1/0016* (2013.01); *G05D 1/0038* (2013.01); *G05D 2201/0202* (2013.01)

(58) Field of Classification Search
CPC ......... B66C 13/40; B66C 13/16; B66C 13/46; G05D 1/0016; G05D 1/0038; G05D 2201/0202; G05D 1/00; G01S 13/87
See application file for complete search history.

(56) References Cited

U.S. PATENT DOCUMENTS

| | | | |
|---|---|---|---|
| 2003/0147727 A1* | 8/2003 | Fujishima | H04Q 9/10 414/200 |
| 2009/0259400 A1* | 10/2009 | Coats | G01S 13/87 701/301 |

(Continued)

FOREIGN PATENT DOCUMENTS

| | | |
|---|---|---|
| JP | H03-213278 A | 9/1991 |
| JP | H09-071386 A | 3/1997 |

(Continued)

OTHER PUBLICATIONS

May 21, 2019, International Search Report issued for related PCT application No. PCT/JP2019/009296.

(Continued)

*Primary Examiner* — Yonel Beaulieu
(74) *Attorney, Agent, or Firm* — Paratus Law Group, PLLC

(57) ABSTRACT

The present invention provides a remote control terminal which achieves both easy visibility and easy control by indicating the movement direction and the movement speed of a work device as a directed segment according to the operation direction and the operation amount of an operation tool. The present invention provides a remote control terminal which remotely controls a crane device of a crane, the remote control terminal being provided with: a terminal-side communication unit; a suspended load movement operation tool; a terminal-side display device; and a terminal-side control device. The terminal-side control device calculates a vector which represents the movement direction and the movement speed of the crane device according to the operation direction and the operation amount of the suspended load movement operation tool, and the terminal-side control device displays an image in which the directed (Continued)

segment representing the vector is superimposed on the image captured by the camera.

9 Claims, 12 Drawing Sheets

(56) References Cited

U.S. PATENT DOCUMENTS

| | | | | |
|---|---|---|---|---|
| 2015/0242769 | A1* | 8/2015 | Kezeu | G06Q 50/265 |
| | | | | 705/7.11 |
| 2020/0007751 | A1* | 1/2020 | Itoh | B25J 9/1697 |

FOREIGN PATENT DOCUMENTS

| | | | |
|---|---|---|---|
| JP | 2000-296985 A | 10/2000 |
| JP | 2008-001453 A | 1/2008 |
| JP | 2016-153335 A | 8/2016 |
| JP | 2016-166086 A | 9/2016 |
| JP | 2016-166087 A | 9/2016 |
| JP | 2016-190719 A | 11/2016 |
| JP | 2017-075001 A | 4/2017 |

OTHER PUBLICATIONS

May 21, 2019, International Search Opinion issued for related PCT application No. PCT/JP2019/009296.

Feb. 15, 2022, European Search Report issued for related EP Application No. 19763718.4.

Nov. 23, 2023, European Communication issued for related EP Application No. 19763718.4.

* cited by examiner

REMOTE CONTROL TERMINAL AND WORK VEHICLE

CROSS REFERENCE TO PRIOR APPLICATION

This application is a National Stage Patent Application of PCT International Patent Application No. PCT/JP2019/009296 (filed on Mar. 8, 2019) under 35 U.S.C. § 371, which claims priority to Japanese Patent Application No. 2018-043258 (filed on Mar. 9, 2018), which are all hereby incorporated by reference in their entirety.

TECHNICAL FIELD

The present invention relates to a remote operation terminal and a work vehicle.

BACKGROUND ART

To date, regarding a work vehicle that includes a work apparatus, such as a mobile crane or an aerial work platform, a work vehicle that takes an image of surroundings of the work apparatus and displays the image on a display apparatus is known. For example, PTL 1 describes an image display apparatus that takes an image including a hook by using a camera provided in a boom of the crane and that displays a movement direction of the hook so as to be superimposed on the image. Thus, an operator can easily recognize the movement direction of the hook.

In recent years, a technology that enables a work apparatus of a work vehicle to be operated by using a remote operation terminal has been proposed. By using the remote operation terminal, an operator can perform work while checking the moving state of a suspended load at a position near the suspended load or at a target position of the suspended load that is separated from the operation apparatus of the work apparatus.

Here, the relative positional relationship between the work apparatus and the remote operation terminal changes in accordance with work conditions. Therefore, it is necessary for the operator, who operates the work apparatus by using the remote operation terminal, to manipulate the remote operation terminal while constantly considering the relative positional relationship with the work apparatus.

CITATION LIST

Patent Literature

PTL 1
Japanese Patent Application Laid-Open No. 2016-166087

SUMMARY OF INVENTION

Technical Problem

Presumably, in the remote operation terminal described above, by displaying the movement direction as described in PTL 1, an operator can operate the work apparatus while checking the movement direction of the hook on the remote operation terminal, irrespective of the relative positional relationship between the work apparatus and the work position. However, it cannot be said that only displaying the movement direction of the hook provides a sufficient amount of information contents for comfortably operating the remote operation terminal. On the other hand, if various information contents are displayed, it becomes cumbersome and the burden on the operator increases. Accordingly, it cannot be said that the remote operation terminal has sufficiently high operability, and there is room for further improvement.

An object of the present invention is to provide a remote operation terminal and a work vehicle each of which provides ease of visibility and ease of operability by displaying the movement direction and the movement speed of a work apparatus by using a directed line segment in accordance with the manipulation direction and the manipulation amount of a manipulation tool.

Solution to Problem

A remote operation terminal according to the present invention, which is a remote operation terminal that remotely operates a work apparatus of a work vehicle, includes: a terminal-side communication device that communicates with a communication device of the work vehicle; a terminal-side manipulation tool for inputting a movement direction and a movement speed of the work apparatus via a manipulation direction and a manipulation amount; a terminal-side display apparatus that displays an image taken by a camera of the work vehicle; and a terminal-side control apparatus that controls the terminal-side communication device, the terminal-side manipulation tool, and the terminal-side display apparatus. Preferably, the terminal-side control apparatus calculates a vector that represents the movement direction and the movement speed of the work apparatus in accordance with the manipulation direction and the manipulation amount of the terminal-side manipulation tool, and the terminal-side display apparatus displays an image in which a directed line segment that represents the vector is superimposed on the image taken by the camera.

In the remote operation terminal according to the present invention, the terminal-side control apparatus is capable of determining a display mode of the directed line segment in accordance with a load factor with respect to a performance limit of the work apparatus.

In the remote operation terminal according to the present invention, the terminal-side control apparatus is capable of determining a display mode of the directed line segment in accordance with whether an obstacle is present in the movement direction of the work apparatus.

In the remote operation terminal according to the present invention, the display mode may be made to differ by combining one or more of a line type, a line color, a blink, and a length of the directed line segment.

In the remote operation terminal according to the present invention, the terminal-side control apparatus may calculate a reference line that serves as a reference of the manipulation direction of the terminal-side manipulation tool, and the terminal-side display apparatus may display an image in which the reference line is superimposed on the image taken by the camera.

In the remote operation terminal according to the present invention, the terminal-side control apparatus may calculate a scale of distance for the reference line in accordance with a height of the work apparatus, and the terminal-side display apparatus may display an image in which the reference line and the scale are superimposed on the image taken by the camera.

The remote operation terminal according to the present invention may further include a terminal-side swivel manipulation tool that manipulates swiveling of the work apparatus, the terminal-side control apparatus may calculate a locus along which the work apparatus is capable of swiveling in accordance with a manipulation of the terminal-side swivel manipulation tool, and the terminal-side display apparatus may display an image in which the locus is superimposed on the image taken by the camera.

A work vehicle according to the present invention includes: a remote operation terminal; a work apparatus that is remotely operated by the remote operation terminal; a camera; and a communication device that communicates with the remote operation terminal. The remote operation terminal includes a terminal-side communication device that communicates with the communication device, a terminal-side manipulation tool for inputting a movement direction and a movement speed of the work apparatus via a manipulation direction and a manipulation amount, a terminal-side display apparatus that displays an image taken by the camera, and a terminal-side control apparatus that controls the terminal-side communication device, the terminal-side manipulation tool, and the terminal-side display apparatus. The terminal-side control apparatus calculates a vector that represents the movement direction and the movement speed of the work apparatus in accordance with the manipulation direction and the manipulation amount of the terminal-side manipulation tool. The terminal-side display apparatus displays an image in which a directed line segment that represents the vector is superimposed on the image taken by the camera.

A work vehicle according to the present invention, including a work apparatus, incudes: a camera; a display apparatus that displays an image taken by the camera; a manipulation tool for inputting a movement direction and a movement speed of the work apparatus via a manipulation direction and a manipulation amount; and a control apparatus that controls the camera, the display apparatus, and the manipulation tool. The control apparatus calculates a vector that represents the movement direction and the movement speed of the work apparatus in accordance with the manipulation direction and the manipulation amount of the manipulation tool. The display apparatus displays an image in which a directed line segment that represents the vector is superimposed on the image taken by the camera.

In the work vehicle according to the present invention, the work apparatus may include a boom, a wire rope that is looped from a base end side toward a distal end side of the boom, and a hook that is suspended from the distal end side of the boom and that is lifted and lowered by pulling in and letting out the wire rope; and the camera may be provided near a distal end the boom and may take an image including the hook.

Advantageous Effects of Invention

With the remote operation terminal and the work vehicle according to the present invention, by displaying the movement direction and the movement speed of the work apparatus by using a directed line segment in accordance with the manipulation direction and the manipulation amount of the manipulation tool, an operator can intuitively understand the movement direction and the movement speed of the work apparatus by only looking at the directed line segment, and can easily perform subsequent operations. That is, both of ease of visibility and ease of operability can be achieved.

DESCRIPTION OF EMBODIMENTS

Hereafter, referring to FIGS. 1 and 2, crane 1, which is a mobile crane (rough-terrain crane), will be described as a work vehicle according to an embodiment of the present invention. Although a crane (rough-terrain crane) is described as an example of a work vehicle in the present embodiment, the work vehicle may be an all-terrain crane, a truck crane, a cargo crane, an aerial work platform, or the like.

Figure 1:
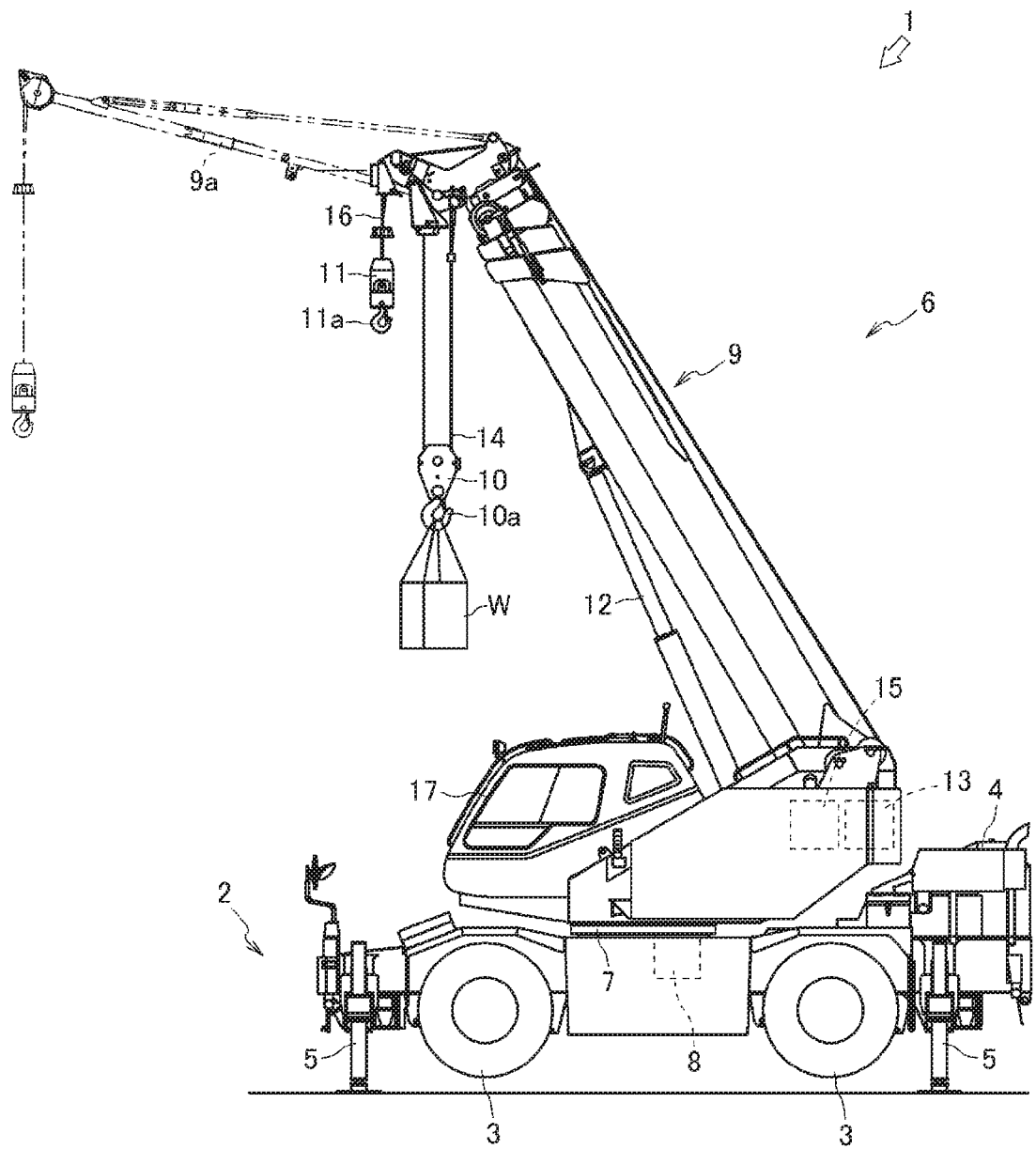
FIG. 1 is a side view illustrating the overall structure of a crane according to an embodiment.

As illustrated in FIG. 1, crane 1 is a mobile crane that can move to any place. Crane 1 includes vehicle 2, crane apparatus 6 that is a work apparatus, and remote operation terminal 32 (see FIG. 2) that can remotely operate crane apparatus 6.

Vehicle 2 transports crane apparatus 6. Vehicle 2 has a plurality of Wheels 3 and travels by using engine 4 as the power source. Outriggers 5 are provided in vehicle 2. Outriggers 5 are composed of extension beams that can be extended by hydraulic pressure to both sides of vehicle 2 in the width direction and hydraulic jack cylinders that can be extended in a direction perpendicular to the ground. Vehicle 2 can expand the workable area of crane 1 by extending outriggers 5 in the width direction of vehicle 2 and by grounding the jack cylinders.

Crane apparatus 6 suspends load W by a wire rope. Crane apparatus 6 includes swivel table 7, boom 9, jib 9a, main hook block 10, sub-hook block 11. lulling hydraulic cylinder 12, main winch 13, main wire rope 14, sub-winch 15, sub-wire rope 16, cabin 17, and the like.

Swivel table 7 configures crane apparatus 6 to be swivelable. Swivel table 7 is provided on a frame of vehicle 2 via an annular bearing. Swivel table 7 is configured to be rotatable around the center of the annular bearing. Hydraulic swivel motor 8, which is an actuator, is provided on swivel table 7. Swivel table 7 is configured to be swivelable by hydraulic swivel motor 8 in one direction and in the other direction.

Hydraulic swivel motor 8 is rotationally operated by swivel valve 23 (see FIG. 2), which is an electromagnetic proportional switching valve. Swivel valve 23 can control the flow rate of hydraulic fluid supplied to hydraulic swivel motor 8 to be any flow rate. That is, swivel table 7 is configured to be controllable by hydraulic swivel motor 8, which is rotationally operated by swivel valve 23, to swivel at any swivel speed. Swivel encoder 27 (see FIG. 2) that detects the swivel position (angle) and the swivel speed of swivel table 7 is provided on swivel table 7.

Boom 9 supports a wire rope in a state in which the wire rope can suspend load W. Boom 9 is composed of a plurality of boom members. A base end of a base boom member of boom 9 is swingably provided at substantially the center of swivel table 7. Boom 9 is configured to be extendable and retractable in the axial direction by moving each of the boom members by using an extension/retraction hydraulic cylinder (not shown), which is an actuator. Jib 9a is provided in boom 9. Jib 9a is supported by a jib support portion, which is provided in the base boom member of boom 9, in a posture along the base boom member. A base end of jib 9a is configured to be capable of being coupled to a jib support portion of a top boom member.

The extension/retraction hydraulic cylinder is operated to extend and retract by extension/retraction valve 24 (see FIG. 2), which is an electromagnetic proportional switching valve. Extension/retraction valve 24 can control the flow rate of hydraulic fluid supplied to the extension/retraction hydraulic cylinder to be any flow rate, in boom 9, boom-length detection sensor 28 that detects the length of boom 9, weight sensor 29 that detects the weight of load W, and azimuth sensor 46 that detects the azimuth around the distal end of boom 9 (see FIG. 2) are provided.

Camera 9b (see FIG. 2) takes an image of main hook 10a or sub-hook 11a, load W, and features around load W. Camera 9b is provided at the distal end of boom 9 or near the distal end of boom 9. Camera 9b is configured to be capable of taking, from vertically above load W, an image of main hook 10a or sub-hook 11a, load W, and features and geography around crane 1.

Main hook block 10 and sub-hook block 11 suspend load W in main hook block 10, a plurality of hook sheaves over which main wire rope 14 is looped, and main hook 10a that suspends load W are provided. Sub-hook 11a, which suspends load W, is provided in sub-hook block 11.

Luffing hydraulic cylinder 12, which is an actuator, luffs up and luffs down boom 9, and maintains the posture of boom 9. An end portion of a cylinder portion of luffing hydraulic cylinder 12 is swingably coupled to swivel table 7, and an end portion of a rod portion of luffing hydraulic cylinder 12 is swingably coupled to the base boom member of boom 9. Luffing hydraulic cylinder 12 is operated to extend and retract by luffing valve 25 (see FIG. 2), which is an electromagnetic proportional switching valve. Lulling valve 25 can control the flow rate of hydraulic fluid supplied to luffing hydraulic cylinder 12 to be any flow rate. Luffing encoder 30 (see FIG. 2) that detects the lulling angle of boom 9 is provided in boom 9.

Main winch 13 and sub-winch 15 pull in (wind up) and let out (wind out) main wire rope 14 and sub-wire rope 16. Main winch 13 is configured so that a main drum, around which main wire rope 14 is wound, is rotated by a main hydraulic motor (not shown), which is an actuator and sub-winch 15 is configured so that a sub drum, around which sub-wire rope 16 is wound, is rotated by a sub-hydraulic motor (not shown), which is an actuator.

Figure 2:
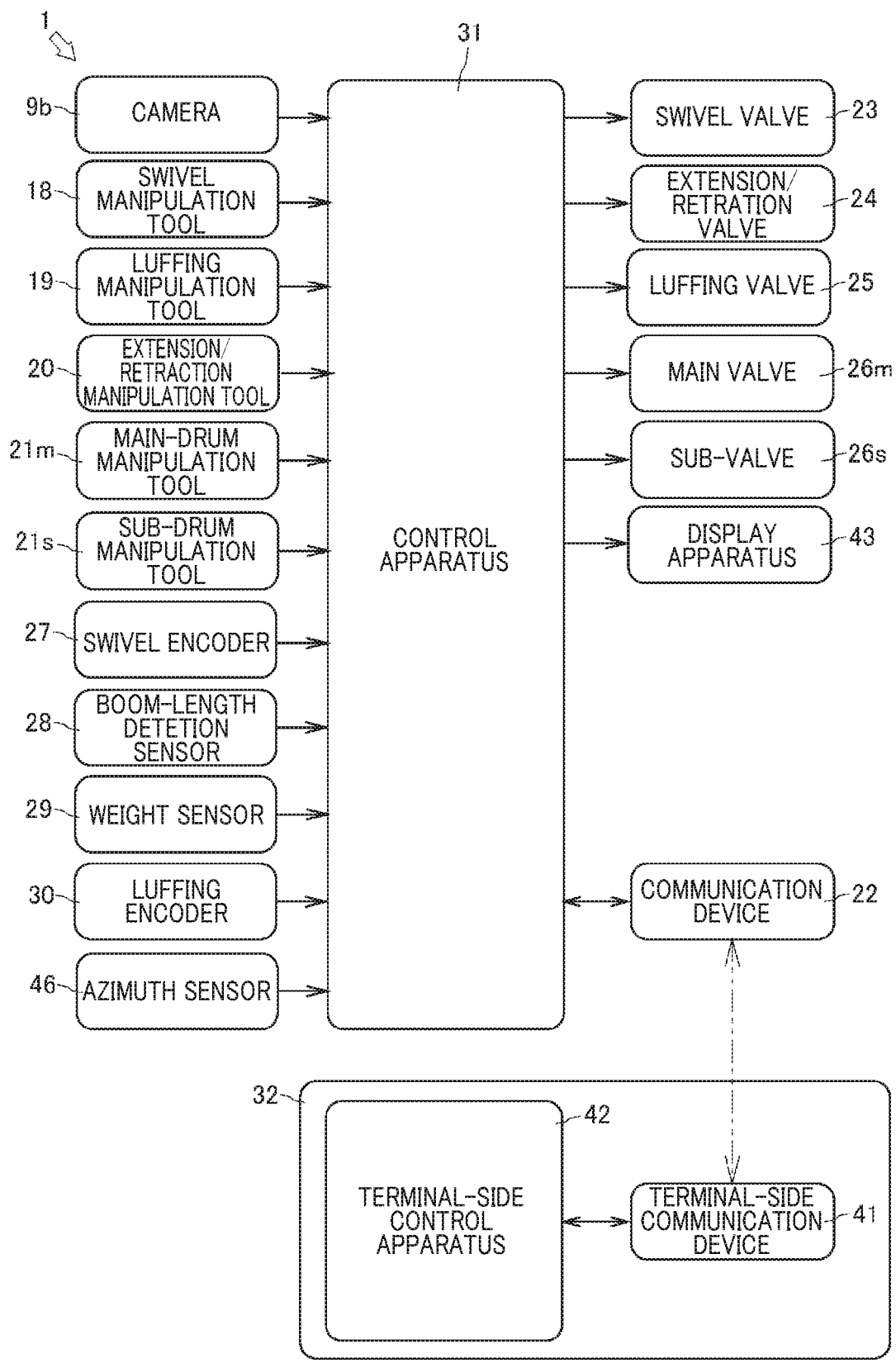
FIG. 2 is a block diagram illustrating the control configuration of the crane according to the embodiment.

The main hydraulic motor is rotationally operated by main valve 26m, which is an electromagnetic proportional switching valve (see FIG. 2). Main winch 13 controls the main hydraulic motor by using main valve 26m, and is configured to be operable at any pull-in speed and at any let-out speed. Likewise, sub-winch 15 controls the main hydraulic motor by using sub-valve 26s (see FIG. 2), which is an electromagnetic proportional switching valve, and is configured to be operable at any pull-in speed and at any let-out speed.

Cabin 17 covers the operator's cab. Cabin 17 is mounted on swivel table 7. In cabin 17, an operator's cab (not shown) is provided. In the operator's cab, a manipulation tool for manipulating travelling of vehicle 2, swivel manipulation tool 18 for manipulating crane apparatus 6, luffing manipulation tool 19, extension/retraction manipulation tool 20, main-drum manipulation tool 21m, sub-drum manipulation tool 21s, and the like are provided (see FIG. 2). Swivel manipulation tool 18 can manipulate hydraulic swivel motor 8. Luffing manipulation tool 19 can manipulate luffing hydraulic cylinder 12. Extension/retraction manipulation tool 20 can manipulate the extension/retraction hydraulic cylinder. Main-drum manipulation tool 21m can manipulate the main hydraulic motor. Sub-drum manipulation tool 21s can manipulate the sub-hydraulic motor.

Communication device 22 (see FIG. 2) receives a control signal from remote operation terminal 32, and transmits control information and the like from crane apparatus 6. Communication device 22 is provided in cabin 17. Communication device 22 is configured so that, when receiving a control signal and the like from remote operation terminal 32, communication device 22 transfers the communication signal and the like to control apparatus 31 via a communication line (not shown). Communication device 22 is configured to transmit control information from control apparatus 31 and image i from camera 9b to remote operation terminal 32 via wireless communication.

Display apparatus 43 (see FIG. 2) displays an image in which various information items are superimposed on image i taken by camera 9b. Display apparatus 43 is composed of an image display apparatus such as a liquid-crystal panel. Display apparatus 43 is provided in cabin 17. Display apparatus 43 is configured to display an image from control apparatus 31.

Azimuth sensor 46 (see FIG. 2) detects the azimuth around the distal end of boom 9 of crane apparatus 6. Azimuth sensor 46 is composed of a triaxial-type azimuth sensor. Azimuth sensor 46 detects geomagnetism and calculates an absolute azimuth. Azimuth sensor 46 is provided at a distal end portion of boom 9.

As illustrated in FIG. 2, control apparatus 31 controls the actuators of crane 1 via valves. Control apparatus 31 is provided in cabin 17. In reality, control apparatus 31 may be configured so that a CPU, a ROM, a RAM, an HDD, and the like are connected by a bus; or may be composed of a one-chip LSI or the like. In control apparatus 31, various programs and data for controlling the operations of actuators, valves, sensors, and the like are stored.

Control apparatus 31 is connected to camera 9b, swivel manipulation tool 18, lulling manipulation tool 19, extension/retraction manipulation tool 20, main-drum manipulation tool 21m, and sub-drum manipulation tool 21s; and can obtain image i taken by camera 9b and the manipulation amount of each of swivel manipulation tool 18, luffing manipulation tool 19, main-drum manipulation tool 21m, and sub-drum manipulation tool 21s.

Control apparatus 31 is connected to communication device 22; can obtain a control signal from remote operation terminal 32; and can transmit control information from crane apparatus 6, image i from camera 9b, and the like.

Control apparatus 31 is connected to swivel valve 23, extension/retraction valve 24, luffing valve 25, main valve 26*m*, and sub-valve 26*s*; and can transfer a control signal to swivel valve 23, luffing valve 25, main valve 26*m*, and sub-valve 26*s*.

Control apparatus 31 is connected to swivel encoder 27, boom-length detection sensor 28, weight sensor 29, and luffing encoder 30; and can obtain the swivel position of swivel table 7. the boom length, the luffing angle, and the weight of load W Control apparatus 31 is connected to display apparatus 43, and can cause display apparatus 43 to display various images. Control apparatus 31 is connected to azimuth sensor 46, and can obtain the azimuth around the distal end of boom 9.

Based on the manipulation amount of each of swivel manipulation tool 18, luffing manipulation tool 19, main-drum manipulation tool 21*m*, and sub-drum manipulation tool 21*s*, control apparatus 31 generates a control signal corresponding to each of the manipulation tools.

Crane 1, which is configured as described above, can move crane apparatus 6 to any position by causing vehicle 2 to travel. Crane 1 can increase the lift and the work radius of crane apparatus 6 by luffing up boom 9 at any luffing angle by using luffing hydraulic cylinder 12 due to a manipulation of luffing manipulation tool 19, and by increasing the length of boom 9 to any length due to a manipulation of extension/retraction manipulation tool 20. Crane 1 can transport load W by suspending load W by using main-drum manipulation tool 21*m* or the like and by swiveling swivel table 7 due to a manipulation of swivel manipulation tool 18.

Figure 3:
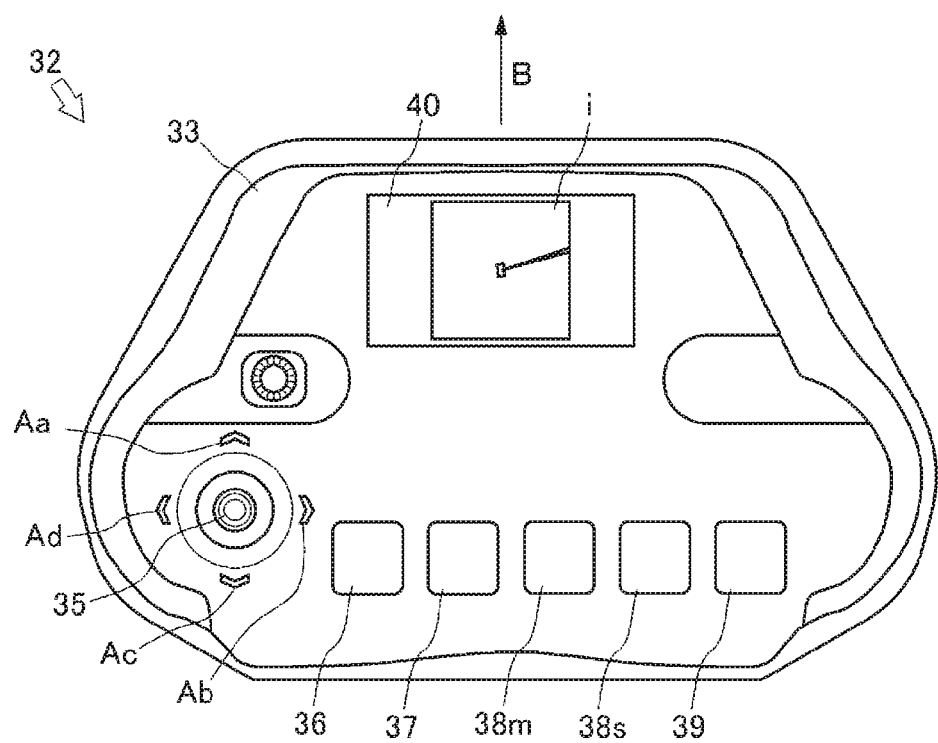
FIG. 3 is a plan view illustrating the schematic configuration of a remote operation terminal according to an embodiment.

Next, referring to FIGS. 3 and 4, remote operation terminal 32 will be described. As illustrated in FIG. 3. remote operation terminal 32 is used to remotely operate crane 1. Remote operation terminal 32 includes housing 33, suspended-load movement manipulation tool 35 that is a terminal-side manipulation tool provided on the operation panel of housing 33, terminal-side swivel manipulation tool 36, terminal-side extension/retraction manipulation tool 37, terminal-side main-drum manipulation tool 38*m*, terminal-side sub-drum manipulation tool 38*s*, terminal-side luffing manipulation tool 39, terminal-side display apparatus 40, terminal-side azimuth sensor 47 (see FIG. 4), terminal-side communication device 41 and terminal-side control apparatus 42 (see FIGS. 2 and 4), and the like. Remote operation terminal 32 transmits, to crane 1, a control signal of a valve of each actuator that moves load W due to a manipulation of suspended-load movement manipulation tool 35 or each terminal-side manipulation tool.

Housing 33 is a main component of remote operation terminal 32. Housing 33 is configured as a case having a size that an operator can hold by hand. On the operation panel of housing 33. suspended-load movement manipulation tool 35, terminal-side swivel manipulation tool 36, terminal-side extension/retraction manipulation tool 37, terminal-side main-drum manipulation tool 38*m*, terminal-side sub-drum manipulation tool 38*s*, terminal-side luffing manipulation tool 39, terminal-side display apparatus 40 and terminal-side communication device 41 (see FIGS. 2 and 4) are provided.

An instruction for moving load W in any direction and at any speed along any horizontal plane is input to suspended-load movement manipulation tool 35. Suspended-load movement manipulation tool 35 is composed of a manipulation stick that stands substantially vertically on the operation panel of housing 33, and a sensor (not shown) that detects the inclination direction and the inclination amount of the manipulation stick. Suspended-load movement manipulation tool 35 is configured so that the manipulation stick can be manipulated to incline in any direction. Suspended-load movement manipulation tool 35 is configured to transfer a signal representing the inclination direction and the inclination amount of the manipulation stick, which is detected by the sensor, to terminal-side control apparatus 42. In suspended-load movement manipulation tool 35, arrow Aa indicating an upward direction when facing the operation panel of housing 33, arrow Ab indicating a rightward direction when facing the operation panel, arrow Ac indicating a downward direction when facing the operation panel, and arrow Ad indicating a leftward direction when facing the operation panel are displayed as guidelines of the manipulation direction of suspended-load movement manipulation tool 35.

An instruction for swiveling crane apparatus 6 in any movement direction at any movement speed is input to terminal-side swivel manipulation tool 36. Terminal-side swivel manipulation tool 36 is composed of a manipulation stick that stands substantially perpendicular to the operation panel of housing 33, and a sensor (not shown) that detects the inclination direction and the inclination amount of the manipulation stick. Terminal-side swivel manipulation tool 36 is configured to be capable of being inclined in a direction for instructing leftward swiveling and a direction for instructing rightward swiveling.

An instruction for extending and retracting extension/retraction boom 9 at any speed is input to terminal-side extension/retraction manipulation tool 37. Terminal-side extension/retraction manipulation tool 37 is composed of a manipulation stick that stands on the operation panel of housing 33, and a sensor (not shown) that detects the inclination direction and inclination amount of the manipulation stick. Terminal-side extension/retraction manipulation tool 37 is capable of being inclined in each of a direction for instructing extension and a direction for instructing retraction.

An instruction for rotating main winch 13 at any speed and in any direction is input to terminal-side main-drum manipulation tool 38*m*. Terminal-side main-drum manipulation tool 38*m* is composed of a manipulation stick stands on the operation panel of housing 33, and a sensor (not shown) that detects the inclination direction and inclination amount of the manipulation stick. Terminal-side main-drum manipulation tool 38*m* is configured to be capable of being inclined in a direction for instructing winding up of main wire rope 14 and in a direction for instructing winding down of main wire rope 14. Terminal-side sub-drum manipulation tool 38*s* is also configured in the same way as described above.

An instruction for luffing extension/retraction boom 9 at any speed is input to terminal-side luffing manipulation tool 39. Terminal-side luffing manipulation tool 39 is composed of a manipulation stick that stands on the operation panel of housing 33, and a sensor (not shown) that detects the inclination direction and inclination amount of the manipulation stick. Terminal-side luffing manipulation tool 39 is configured to be capable of being inclined in a direction for instructing luffing up and a direction for instructing luffing down.

Terminal-side display apparatus 40 displays an image in which various information items are superimposed on image i taken by camera 9*b*. Terminal-side display apparatus 40 is composed of an image display apparatus such as a liquid-crystal panel. Terminal-side display apparatus 40 is provided on the operation panel of housing 33. Terminal-side display apparatus 40 is configured to display an image from terminal-side control apparatus 42.

Terminal-side azimuth sensor 47 is composed of a tri-axial-type azimuth sensor. Terminal-side azimuth sensor 47 detects geomagnetism and calculates an absolute azimuth. Terminal-side azimuth sensor 47 is configured to calculate the azimuth around housing 33 in a state in which the operation peel of housing 33 of remote operation terminal 32 faces upward.

Figure 4:
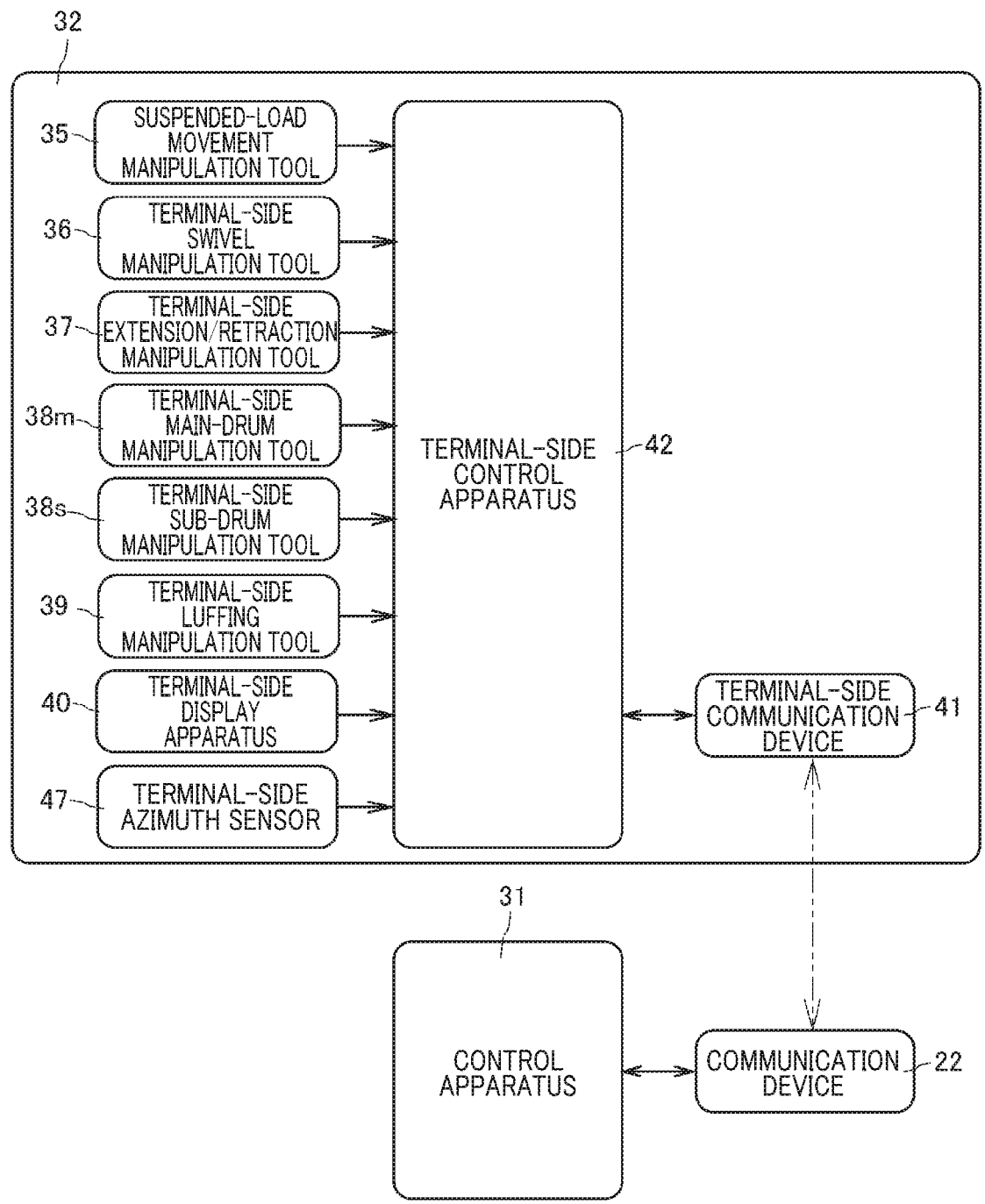
FIG. 4 is a block diagram illustrating the control configuration of the remote operation terminal according to the embodiment.

As illustrated in FIG. 4, terminal-side communication device 41 receives control information and the like of crane apparatus 6, and transmits control information and the like from remote operation terminal 32. Terminal-side communication device 41 is provided inside of housing 33. Terminal-side communication device 41 is configured so that, when receiving image i, a control signal, and the like from crane 1, terminal-side communication device 41 transfers these to terminal-side control apparatus 42. Terminal-side communication device 41 is configured to transmit control information from terminal-side control apparatus 42 to crane 1.

Terminal-side control apparatus 42 controls remote operation terminal 32. Terminal-side control apparatus 42 is provided in housing 33 of remote operation terminal 32. In reality, terminal-side control apparatus 42 may be configured so that a CPU, a ROM, a RAM, an HDD, and the like are connected by a bus; or may he a one-chip LSI or the like. Terminal-side control apparatus 42 stores programs and data for controlling the operations of suspended-load movement manipulation tool 35, terminal-side swivel manipulation tool 36, terminal-side extension/retraction manipulation tool 37, terminal-side main-drum manipulation tool 38m, terminal-side sub-drum manipulation tool 38s, terminal-side luffing manipulation tool 39, terminal-side display apparatus 40, terminal-side azimuth sensor 47, terminal-side communication device 41, and the like.

Terminal-side control apparatus 42 is connected to suspended-load movement manipulation tool 35, terminal-side swivel manipulation tool 36, terminal-side extension/retraction manipulation tool 37, terminal-side main-drum manipulation tool 38m, terminal-side sub-drum manipulation tool 38s, and terminal-side luffing manipulation tool 39; and can obtain operation signals of the inclination directions and the inclination amounts of the manipulation sticks of these terminal-side manipulation tools. Terminal-side control apparatus 42 calculates a vector that represents the movement direction and the movement speed of the distal end of boom 9 in accordance with the operation signals.

Terminal-side control apparatus 42 can generate, from the operation signals of the operations sticks obtained from the sensors of suspended-load movement manipulation tool 35, terminal-side swivel manipulation tool 36, terminal-side extension/retraction manipulation tool 37, terminal-side main-drum manipulation tool 38m, terminal-side sub-drum manipulation tool 38s, and terminal-side luffing manipulation tool 39, controls signals of corresponding swivel valve 23, extension/retraction valve 24, luting valve 25, main valve 26m, and sub-valve 26s.

Terminal-side control apparatus 42 is connected to terminal-side display apparatus 40, and can display image i from crane 1 and a directed line segment that represents the aforementioned vector on terminal-side display apparatus 40. Terminal-side control apparatus 42 is connected to terminal-side communication device 41, and can transmit various information items to and receive various information items from communication device 22 of crane 1 via terminal-side communication device 41.

Terminal-side control apparatus 42 is connected to terminal-side azimuth sensor 47, and can obtain an azimuth signal of the azimuth around housing 33 in a state in which the operation panel of housing 33 faces upward. Terminal-side control apparatus 42 can obtain the azimuth signal of the azimuth around the distal end of the boom 9 via terminal-side communication device 41.

In the present embodiment, an example in which the display direction of image i displayed on remote operation terminal 32 is determined with reference to an azimuth will be described. For example, in a case where the upward direction when facing the operation panel of housing 33 of remote operation terminal 32 directed toward the north, terminal-side control apparatus 42 obtains the northerly direction in image i taken by camera 9b based on an azimuth calculated by azimuth sensor 46, and terminal-side display apparatus 40 displays image i taken by camera 9b in such a way that image i is rotated so that the northerly direction in image i coincides with the upward direction of housing 33. When remote operation terminal 32 is rotationally operated, image i displayed on terminal-side display apparatus 40 also rotates so as to maintain the azimuth in accordance with the rotational operation. Thus, remote operation terminal 32 is configured to automatically display image i in such a way that the azimuth of image i coincides with the azimuth on the operation panel of housing 33 by using azimuth sensor 46 and terminal-side azimuth sensor 47.

Figure 5:
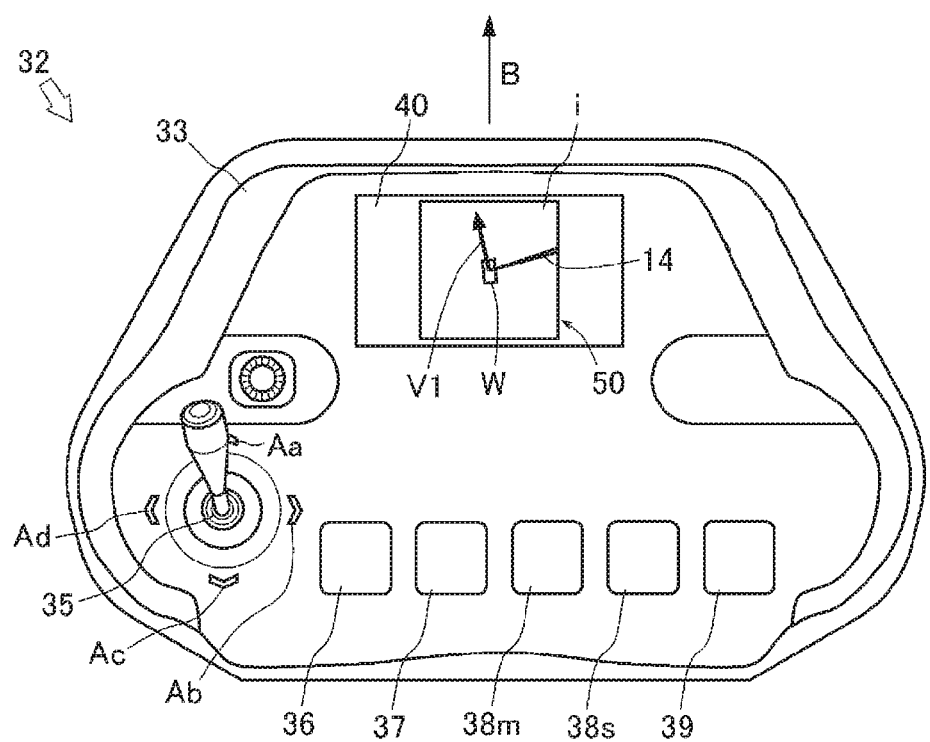
FIG. 5 is plan view of the remote operation terminal, illustrating a first display mode.

Next, referring to FIGS. 5 to 12, display modes of terminal-side display apparatus 40 will be described. FIG. 5 is a plan view of remote operation terminal 32, illustrating a first display mode. As illustrated in FIG. 5, remote operation terminal 32 can display, on terminal-side display apparatus 40, image 50 in which directed line segment V1 is superimposed on image i taken by camera 9b. The generation process of image 50 is as follows. It is assumed that, during work using remote operation terminal 32, unless a special operation is performed, terminal-side display apparatus 40 displays image i taken by camera 9b in real time.

When an operator manipulates suspended-load movement manipulation tool 35, terminal-side control apparatus 42 obtains an operation signal that is composed of the inclination direction (manipulation direction) and the inclination amount (manipulation amount) of the manipulation stick with reference to the azimuth of suspended-load movement manipulation tool 35. Next, terminal-side control apparatus 42 calculates a vector that represents the movement direction and the movement speed of the distal end of boom 9 in accordance with the operation signal. Next, terminal-side control apparatus 42 generates directed line segment V1 that represents the vector. Next, terminal-side control apparatus 42 generates image 50 in which directed line segment V1 is superimposed on image i taken by camera 9b, and outputs image 50 to terminal-side display apparatus 40.

Then, terminal-side display apparatus 40 displays image 50. In image 50, the direction of directed line segment V1 coincides with the manipulation direction of suspended-load movement manipulation tool 35, and the length of directed line segment V1 is a length corresponding to the manipulation amount of suspended-load movement manipulation tool 35. For example, when the manipulation amount of suspended-load movement manipulation tool 35 is the maximum, the length of directed line segment V1 may be half the length of one side of image 50.

Thus, an operator can intuitively understand the movement direction and the movement speed of load W by only looking at directed line segment V1, and can easily perform subsequent operations. Thus, with remote operation terminal 32 having the first display mode, both of ease of visibility and ease of operability can be achieved.

Figure 6:
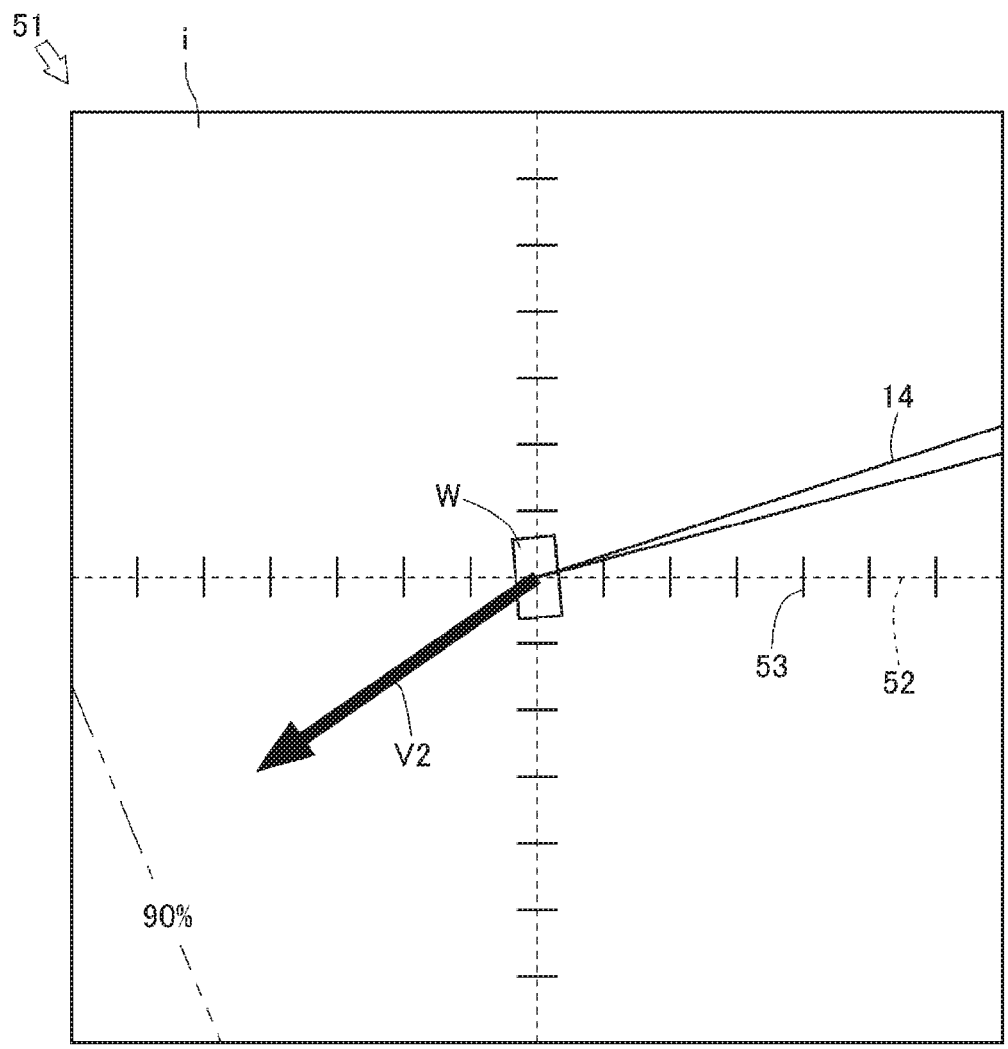
FIG. 6 illustrates an image in a second display mode.

FIG. 6 illustrates image 51 in a second display mode. In image 51, directed line segment V2, reference lines 52 that cross, and scale 53 added to reference lines 52 are superimposed on image i taken by camera 9b. Reference lines 52 and scale 53 are calculated by terminal-side control apparatus 42.

Reference lines 52 are each a line that serves as a reference of the manipulation direction of suspended-load movement manipulation tool 35. In the present embodiment, a vertical line of reference lines 52 is displayed so as to be parallel to the direction of arrows Aa and Ac of suspended-load movement manipulation tool 35, a horizontal line of reference lines 52 is displayed so as to be parallel to the direction of arrows Ab and Ad of suspended-load movement manipulation tool 35, and the vertical line and the horizontal line are displayed so as to intersect at the positon of the distal end of boom 9. Thus, an operator can intuitively understand that the distal end of boom 9 is located at the intersection of reference lines 52, and that reference lines 52 extend along arrows Aa, Ab, Ac, and Ad of suspended-load movement manipulation tool 35; and can easily manipulate suspended-load movement manipulation tool 35 with reference to reference lines 52.

In the present embodiment, the reference lines 52 are broken lines. However, the line type of and the line color of reference lines 52 are not particularly limited, and it is sufficient that reference lines 52 are distinguishable from other images. In addition to the vertical line and the horizontal line, a diagonal line may be displayed as reference lines 52

Figure 7:
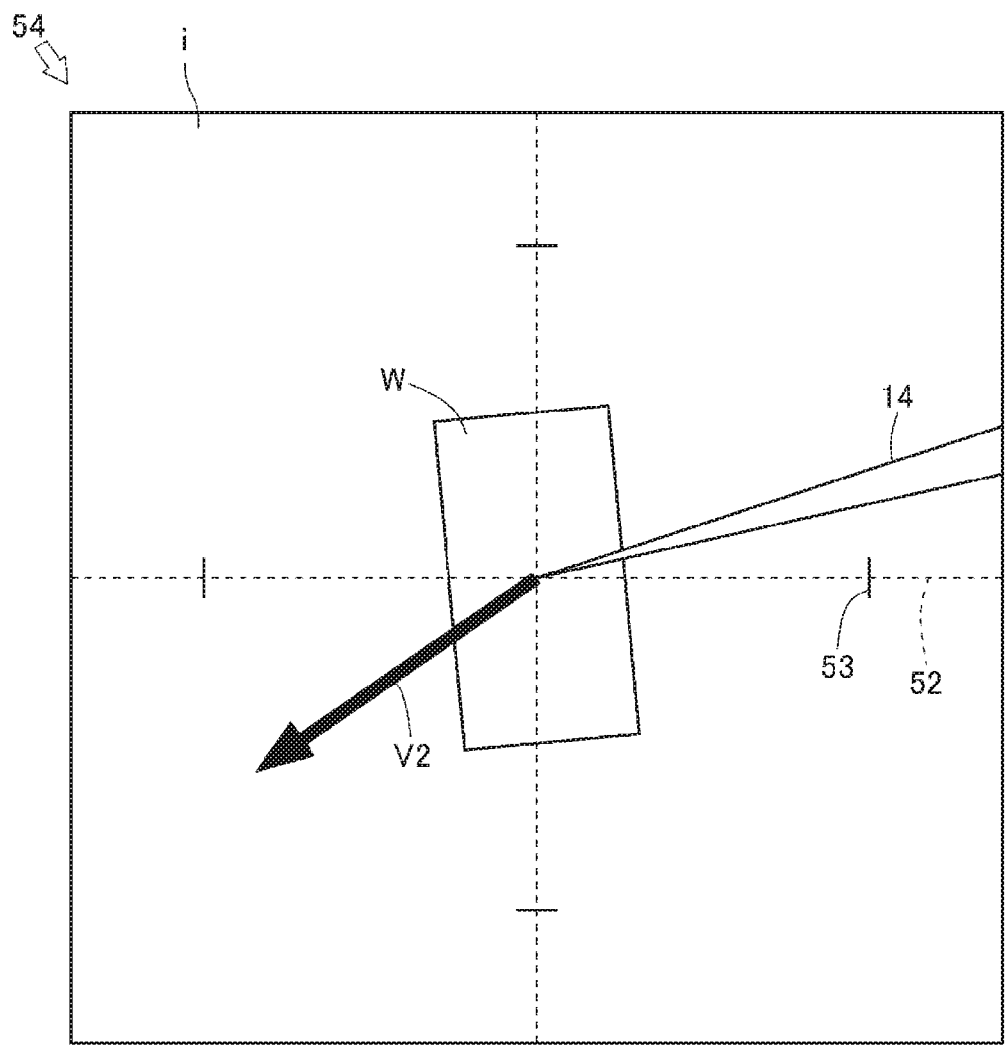
FIG. 7 illustrates another image in the second display mode.

Scale 53 indicates a distance in a horizontal direction in accordance with the height of load W (when load W is not suspended, main hook 10a) from the ground. In FIG. 6, for example, the height of load W is 1 meter, and one notch corresponds to 1 meter. FIG. 7 displays another image 54 in the second display mode. FIG. 7, for example, the height of load W is 50 meter, and one notch corresponds to 1 meter. In FIG. 7, because the height of load W is larger than that in FIG. 6, one notch of the scale is larger for the same distance on image i taken by camera 9b. Thus, an operator can intuitively understand, from the spacing of scale 53, whether load W is at a high position or at a low position; and can easily manipulate suspended-load movement manipulation tool 35 by using scale 53 as a guideline for the movement distance of load W in the horizontal direction.

Figure 8:
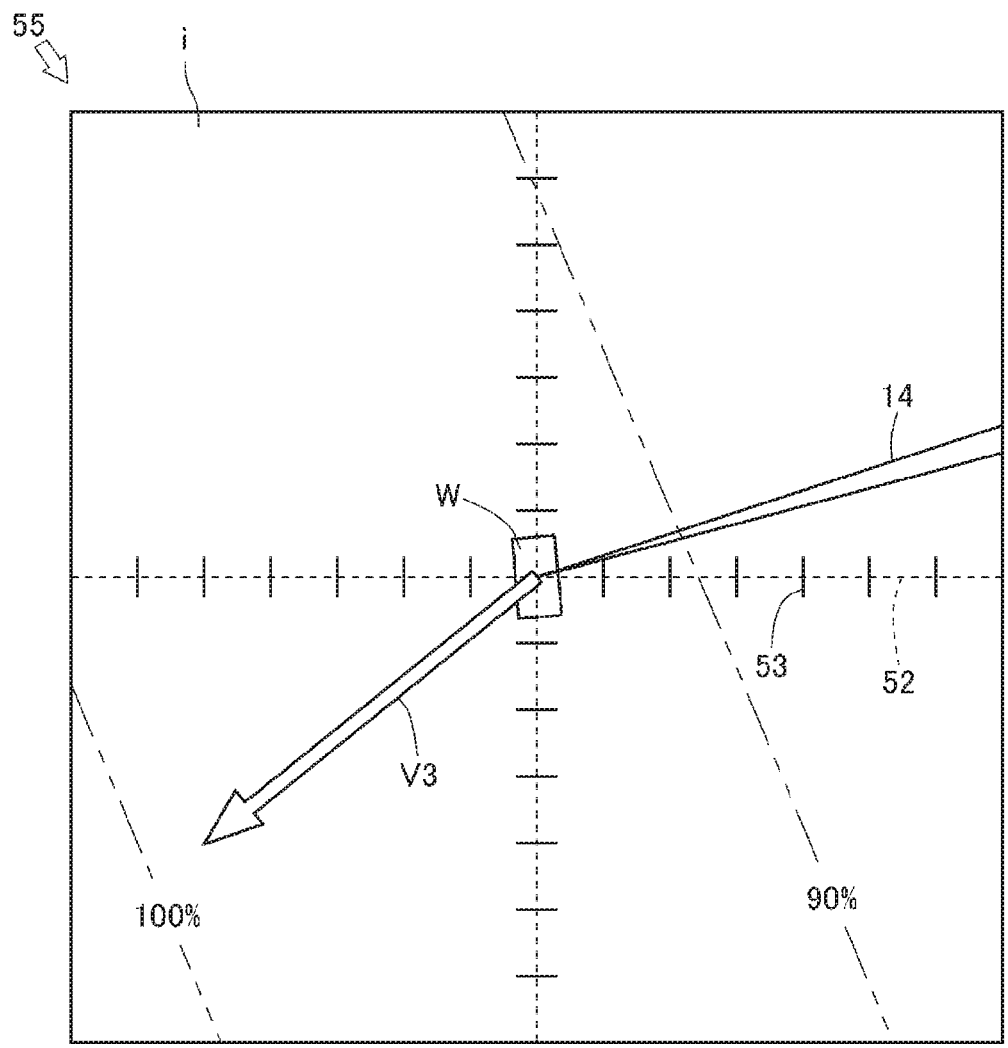
FIG. 8 illustrates an image in a third display mode.

FIG. 8 illustrates image 55 in a third display mode. In image 55, directed line segment V3, reference lines 52, and scale 53 are superimposed on image i taken by camera 9b.

Directed line segment V3 represents the movement direction and the movement speed of the distal end of boom 9, and also represents a load factor with respect to the performance limit of crane apparatus 6 by using a line color. That is, the line color of directed line segment V3 is determined by terminal-side control apparatus 42 in accordance with the load factor with respect to the performance limit of crane apparatus 6. The performance limit of crane apparatus 6 is determined by the length of the extendable beams of outriggers 5, the length of boom 9, the weight of load W and the like. The load factor is a value representing the present position of the distal end of boom 9 with respect to the performance limit as proportion.

For example, the line color may be green when load factor is lower than 90%, the line color may be yellow when the load factor is 90% or higher and lower than 100%, and the line color may be red when the load factor is 100%. FIG. 8 illustrates a case where the load factor is 90% or higher and lower than 100%. FIG. 6 illustrates a case where the load factor is lower than 90%. Lines representing load factors of 90% and 100% may displayed or may not be displayed.

Thus, an operator can understand the load factor corresponding to the present operation, and can safely perform subsequent operations. At this time, because the operator can intuitively understand the load factor from the line color of directed line segment V3, the operator can easily perform subsequent operations.

The display mode of directed line segment V3 representing the load factor need not be a line color, and may be a display mode that is made to differ by combining one or more of a line type, a line color, a blink, and the length of directed line segment V3. For example, directed line segment V3 may brink in red when the load factor exceeds 100%. As the load factor increases, the length of directed line segment V3 may be shortened irrespective of the movement speed.

Figure 9:
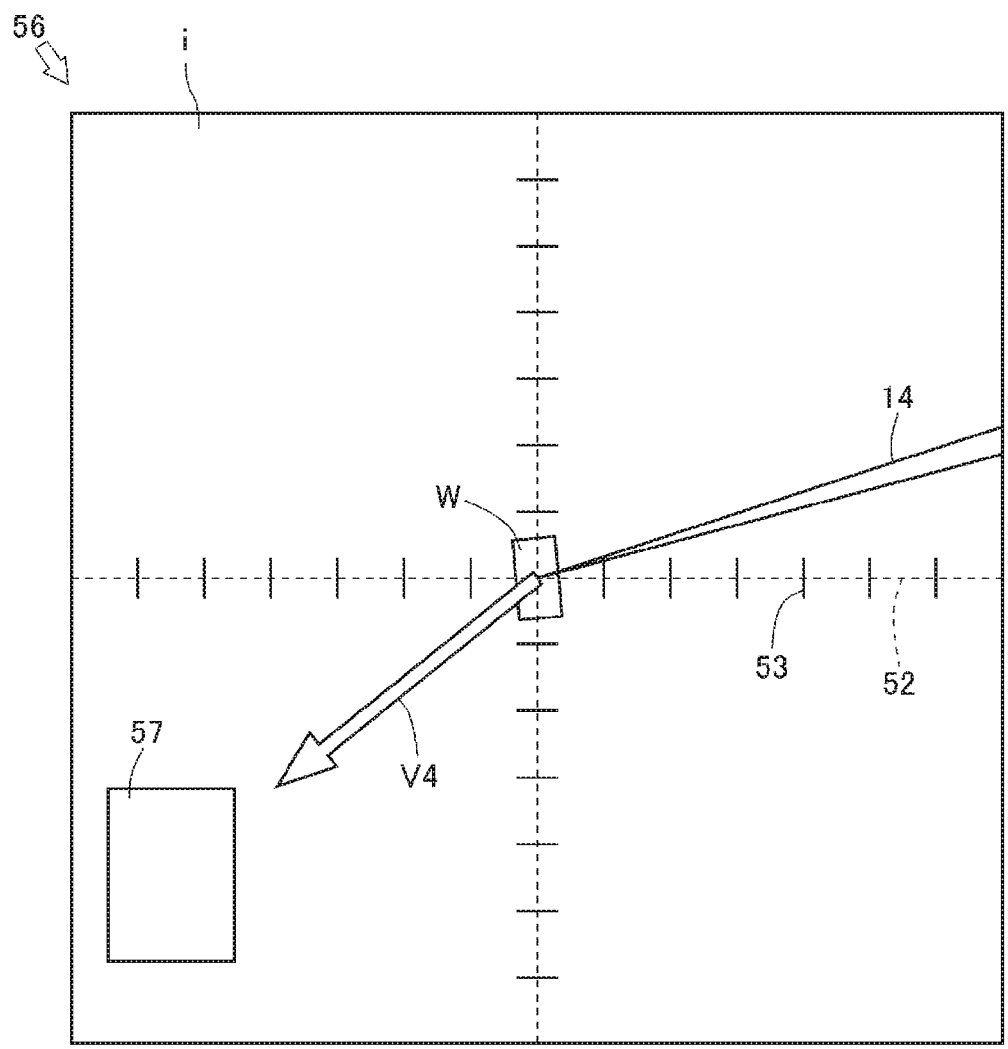
FIG. 9 illustrates an image in a fourth display mode.

FIG. 9 illustrates image 56 in a fourth display mode. In image 56, directed line segment V4, reference lines 52, and scale 53 are superimposed on image i (including obstacle 57) taken by camera 9b.

Directed line segment V4 represents the movement direction and the movement speed of the distal end of boom 9, and represents, by using a line color, whether an obstacle is present in the movement direction of load W (when load W is not suspended, main hook 10a). That is, the line color of directed line segment V4 is determined in terminal-side control apparatus 42 in accordance with whether an obstacle is present in the movement direction of crane apparatus 6. The position of an obstacle can be obtained, for example, by analyzing image i. Whether an obstacle is present in the movement direction of load W may be determined in consideration of the height of load W, or may be compared in a plane on image i while neglecting the height.

For example, the line color of the directed line segment V2 may be green when an obstacle such as a building is not present in the movement direction of load W as illustrated in FIG. 6, and the line color of directed line segment V4 may be red when an obstacle 57 such as a building is present in the movement direction of load W as illustrated in FIG. 9, Thus, an operator can intuitively understand whether obstacle 57 is present in the present manipulation direction from the line color of directed line segment V4, and can easily perform subsequent operations.

The display mode of directed line segment V4 representing whether an obstacle is present need not be a line color, and may be a display mode that is made to differ by combining one or more of a line type, a line color, a blink, and the length of directed line segment V4. For example, directed line segment V4 may brink in red when an obstacle is present. As load W approaches an obstacle, the length of directed line segment V4 may be shortened irrespective of the movement speed. When determining that load W may collide with obstacle 57, terminal-side control apparatus 42 may output a control signal that stops the action of crane apparatus 6.

Figure 10:
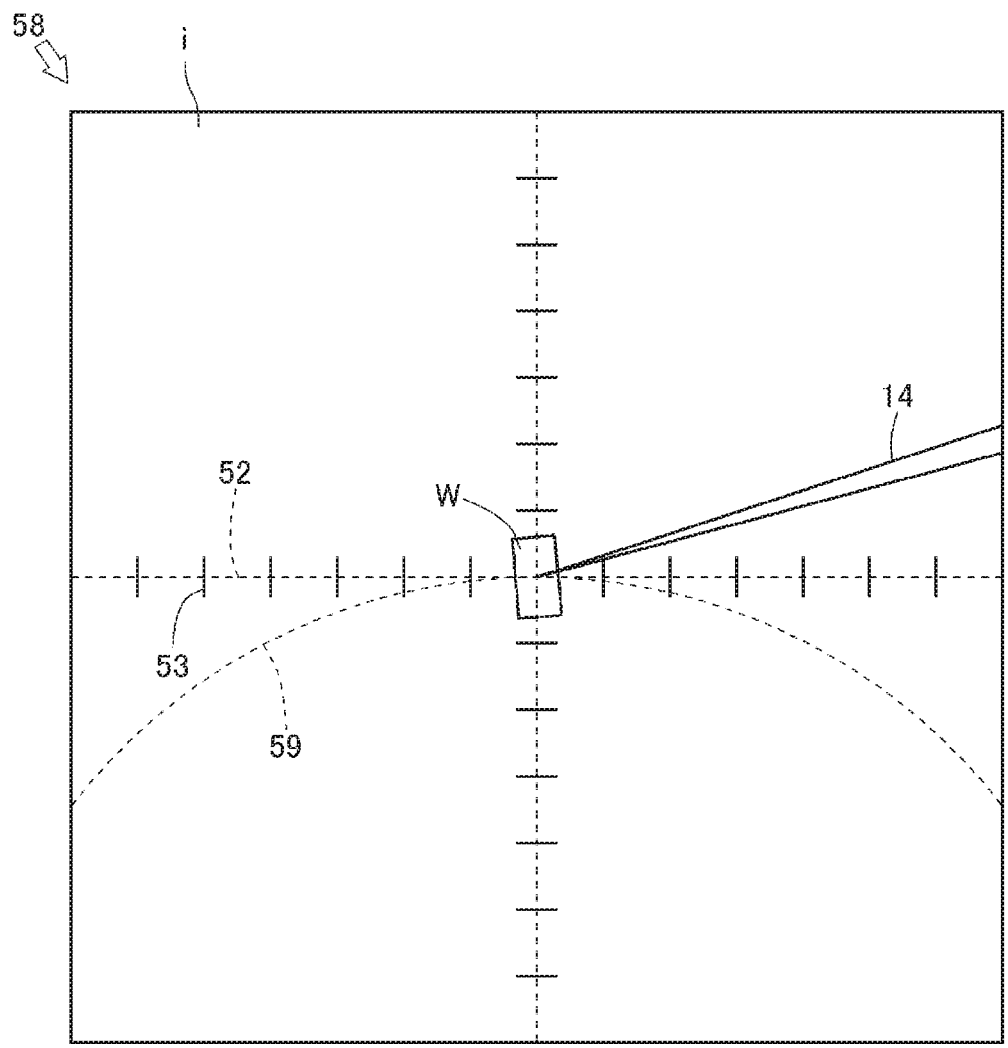
FIG. 10 illustrates an image in a fifth display mode.

FIG. 10 illustrates image 58 in a fifth display mode. In image 58, reference lines 52, scale 53, and swivelable locus 59 are superimposed on image i taken by camera 9b. Swivelable locus 59 is calculated by terminal-side control apparatus 42.

Swivelable locus 59 is a line representing a locus along which the distal end of boom 9 can swivel. Swivelable locus 59 is displayed in accordance with a manipulation of terminal-side swivel manipulation tool 36. Thus, an operator can check a positon to which load W is movable by looking at swivelable locus 59, and can easily perform subsequent operations.

Figure 11:
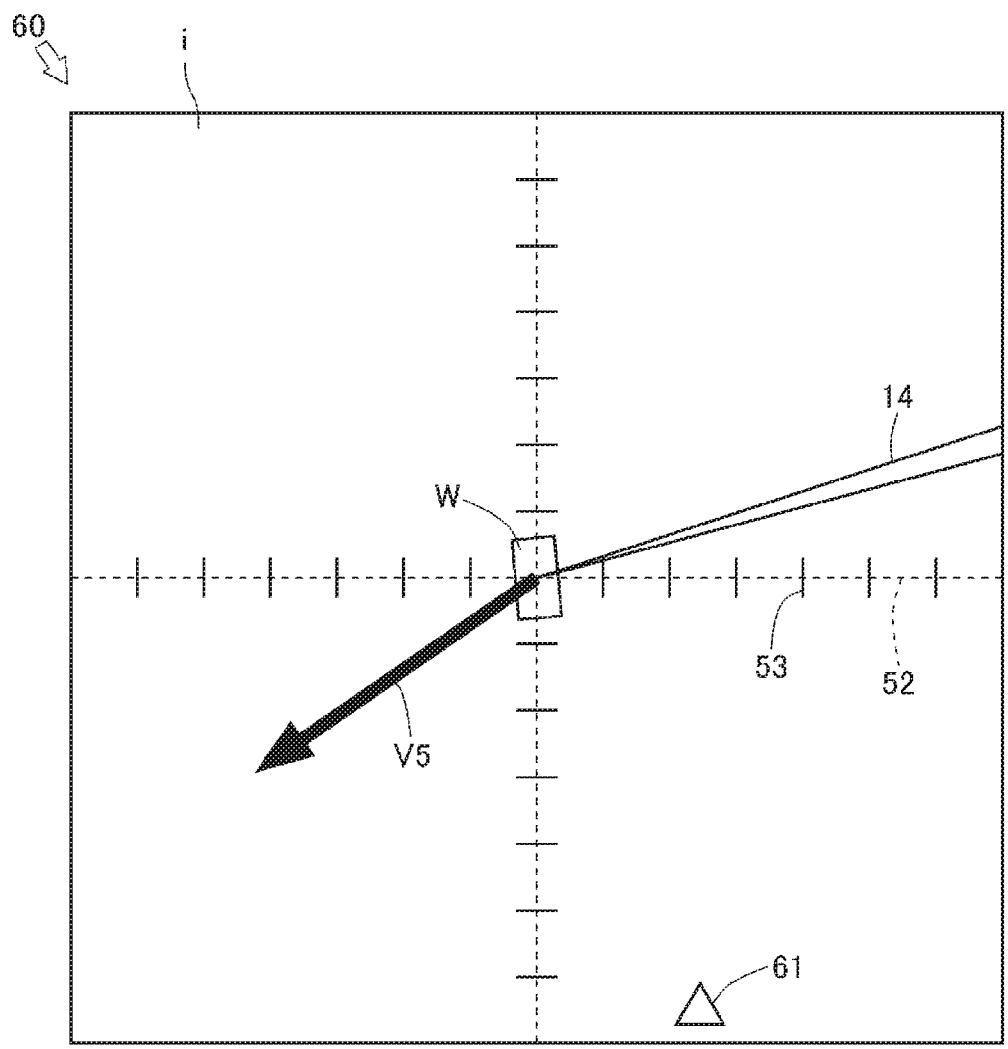
FIG. 11 illustrates an image in a sixth display mode.
Figure 12:
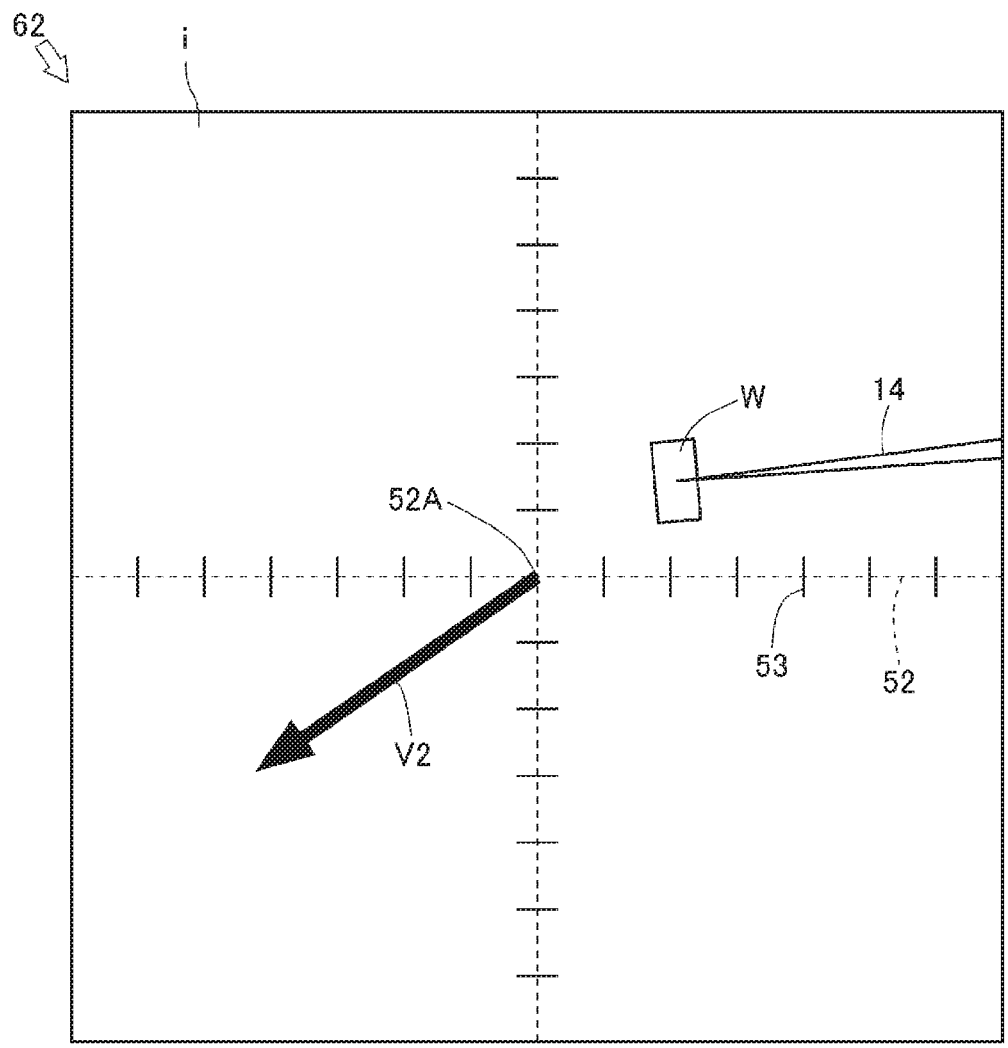
FIG. 12 illustrates another image in the second display mode.

FIG. 11 illustrates image 60 in a sixth display mode. In image 60, directed line segment V5, reference lines 52, scale 53, and placement mark 61 are superimposed on image i taken by camera 9b. The position where placement mark 61 is to be displayed is calculated by terminal-side control apparatus 42.

Placement mark 61 is a mark indicating the direction of vehicle 2 located outside of image 60. In the present embodiment, placement mark 61 is denoted by a triangle. Thus, an operator can constantly recognize, on image 60, the placement direction of vehicle 2 from load W, irrespective of the orientation of camera 9b.

The position of the distal end of boom 9 and the position of load W are displayed differently in each of the first to sixth display modes, because load W moves with a delay relative to the movement of the distal end of boom 9 when the distal end of boom 9 starts moving. For example, when the distal end of the boom starts moving from the state illustrated in FIG. 6, image 62 illustrated in FIG, 12 is displayed. In image 62, intersection 52A of reference lines 52, which represents the position of the distal end of boom 9, is located at the center of image 62; the initial point of directed line segment V2 is located at intersection 52A, and load W is located so as to be separated from intersection 52A in a direction opposite from directed line segment V2.

Thus, an operator can recognize the amplitude of swinging of load W from the positional relationship between intersection 52A of reference line 52 and load W, and can easily perform subsequent operations. For example, after boom 9 has stopped, the operator can stop swinging of load W in a short time after the movement by repeatedly manipulating suspended-load movement manipulation tool 35 in a direction from intersection 52A of reference lines 52 toward load W.

A manipulation tool has a so-called "dead zone" in which crane apparatus 6 does not actually start moving even when a manipulation is input. The dead zone is generated, for example, for the following reason. That is, a manipulation tool detects a manipulation that is input, and outputs an operation signal corresponding to the detected manipulation. However, crane apparatus 6 does not start moving when a hydraulic pressure that is generated in accordance with the opening degree of a valve due to the operation signal is small relative to the load of load W. Accordingly, the dead zone is mainly generated in a range where the manipulation amount of the manipulation tool is small.

In contrast, because control apparatus 31 and terminal-side control apparatus 42 obtains an operation signal while including the dead zone, when, for example, suspended-load movement manipulation tool 35 is manipulated in the dead zone, a vector and a directed line segment are calculated in accordance with the manipulation direction and the manipulation amount. However, because crane apparatus 6 does not actually start moving due to a manipulation of a manipulation tool in the dead zone, preferably, a directed line segment that represents the movement direction and the movement speed of the distal end of boom 9 is not displayed. Thus, an operator can recognize the timing at which crane apparatus 6 actually starts moving, and can perform precise operations.

During a manipulation of suspended-load movement manipulation tool 35 described above, preferably, the direction of remote operation terminal 32 is fixed. That is, from the start to the end of the manipulation of suspended-load movement manipulation tool 35, control is performed by using the azimuth of terminal-side azimuth sensor 47 that is obtained at the time when the manipulation was started. Thus, even when an operator changes the orientation while manipulating suspended-load movement manipulation tool 35 and the direction of remote operation terminal 32 changes, an image displayed on terminal-side display apparatus 40 is displayed based on the azimuth at the time when the manipulation started, and the inclination direction of suspended-load movement manipulation tool 35 is also calculated based on the azimuth at the time when the manipulation was started. As a result, an unintended operation can be prevented, because the movement direction of load W (the working direction of crane apparatus 6) does not change even when the orientation is changed while inclining suspended-load movement manipulation tool 35 in a certain direction.

Hereafter, modifications of the embodiment described above will be listed. The shape of the frame of image i may be rectangular or circular. Image i may be an image that is represented three-dimensionally by using 3D mapping or the like. A vector and a directed line segment can be represented three-dimensionally on a three-dimensional image. Terminal-side display apparatus 40 may be a head mount display (HMD). Similar display modes can be applied to a case where load W is suspended by sub-hook 11a.

In the embodiment described above, display modes of terminal-side display apparatus 40 have been described. However, it is possible to perform similar display by using display apparatus 43 on crane 1 side. In this case, control apparatus 31 calculates a vector that represents the movement direction and the movement speed of the distal end of boom 9 in accordance with the manipulation direction and the manipulation amount of crane 1 side manipulation tools, and display apparatus 43 displays an image in which a directed line segment representing the vector is superimposed on image i taken by camera 9b. This configuration is applicable to a crane that does not have remote operation terminal 32.

In the embodiment described above, image i displayed on terminal-side display apparatus 40 is displayed in an orientation that coincides with the actual azimuth. However, image i may be displayed on terminal-side display apparatus 40 in an orientation with reference to a parameter other than the azimuth. For example, image i may be displayed with reference to the forward direction of vehicle 2.

INDUSTRIAL APPLICABILITY

The present invention is applicable to a remote operation terminal and a work vehicle.

REFERENCE SIGNS LIST

1 Crane (Work vehicle)
6 Crane apparatus (Work apparatus)
9 Boom
9b Camera
10a Main hook (Hook)
11a Sub-hook (Hook)
14 Main wire rope (Wire rope)
16 Sub-wire rope (Wire rope)
22 Communication device
31 Control apparatus
32 Remote operation terminal
35 Suspended-load movement manipulation tool (Terminal-side manipulation tool)
36 Terminal-side swivel manipulation tool 40 Terminal-side display apparatus
41 Terminal-side communication device
42 Terminal-side control apparatus
43 Display apparatus
52 Reference line
53 Scale
57 Obstacle
59 Swivelable locus (locus)
V1 to V5 Directed line segment

The invention claimed is:

1. A remote operation terminal that is portable by an operator and is used for remotely operating a work apparatus of a work vehicle, the remote operation terminal comprising:
    a terminal-side communication device configured to communicate with a communication device of the work vehicle;
    a terminal-side manipulation tool configured to input a movement direction and a movement speed of the work apparatus via a manipulation direction and a manipulation amount;
    a terminal-side azimuth sensor configured to detect geomagnetism and calculate an azimuth around a housing in a state in which an operation panel of the housing of the remote operation terminal faces upward;
    a terminal-side control apparatus configured to calculate a vector that represents the movement direction and the movement speed of the work apparatus in accordance with the manipulation direction and the manipulation amount of the terminal-side manipulation tool; and
    a terminal-side display apparatus that is provided on the operation panel of the housing of the remote operation terminal and is configured to display an image in which a directed line segment that represents the vector is superimposed on an image taken by a camera of the work vehicle,
    wherein the terminal-side display apparatus is configured to
        make a first azimuth and a second azimuth corresponding to each other, the first azimuth being an azimuth of the operation panel of the housing and indicated by the terminal-side azimuth sensor and the second azimuth being an azimuth in an image taken by the camera and indicated by a vehicle-side azimuth sensor provided to the work vehicle, and
        rotate the image taken by the camera in a displayed image such that a direction in the image coincides with a direction of the operation panel of the housing.

2. The remote operation terminal according to claim 1, wherein:
    the terminal-side control apparatus is further configured to determine a display mode of the directed line segment in accordance with a load factor with respect to a performance limit of the work apparatus.

3. The remote operation terminal according to claim 1, wherein:
    the terminal-side control apparatus is further configured to determine a display mode of the directed line segment in accordance with whether an obstacle is present in the movement direction of the work apparatus.

4. The remote operation terminal according to claim 2, wherein:
    the display mode is made to differ by combining one or more of a line type, a line color, a blink, and a length of the directed line segment.

5. The remote operation terminal according to claim 1, wherein:
    the terminal-side control apparatus is further configured to calculate a reference line that serves as a reference of the manipulation direction of the terminal-side manipulation tool; and
    the terminal-side display apparatus is further configured to display an image in which the reference line is superimposed on the image taken by the camera.

6. The remote operation terminal according to claim 5, wherein:
    the terminal-side control apparatus is further configured to calculate a scale of distance for the reference line in accordance with a height of the work apparatus; and
    the terminal-side display apparatus is further configured to display an image in which the reference line and the scale are superimposed on the image taken by the camera.

7. The remote operation terminal according to claim 1, further comprising:
    a terminal-side swivel manipulation tool configured to manipulate swiveling of the work apparatus, wherein:
    the terminal-side control apparatus is further configured to calculate a locus along which the work apparatus is capable of swiveling in accordance with a manipulation of the terminal-side swivel manipulation tool; and
    the terminal-side display apparatus is further configured to display an image in which the locus is superimposed on the image taken by the camera.

8. A work vehicle, comprising:
    the remote operation terminal according to claim 1;
    the work apparatus that is remotely operated by the remote operation terminal;
    the camera; and
    the communication device configured to communicate with the remote operation terminal.

9. The work vehicle according to claim 8, wherein:
    the work apparatus includes a boom, a wire rope that is stretched from a base end side toward a distal end side of the boom, and a hook that is suspended from the distal end side of the boom and that is lifted and lowered by pulling in and letting out the wire rope; and
    the camera is provided near a distal end the boom to take an image including the hook.

* * * * *